(12) United States Patent
Gao

(10) Patent No.: US 10,596,955 B2
(45) Date of Patent: Mar. 24, 2020

(54) MULTIFUNCTIONAL VEHICLE ALARM LAMP

(71) Applicant: Ningbo Kaishuo Lighting Technology Co., Ltd., Yuyao, Zhejiang Province (CN)

(72) Inventor: Yanhua Gao, Yuyao (CN)

(73) Assignee: NINGBO KAISHUO LIGHTING TECHNOLOGY CO., LTD. (CN)

( * ) Notice: Subject to any disclaimer, the term of this patent is extended or adjusted under 35 U.S.C. 154(b) by 0 days.

(21) Appl. No.: 16/349,515

(22) PCT Filed: Jun. 30, 2017

(86) PCT No.: PCT/CN2017/091151
§ 371 (c)(1),
(2) Date: May 13, 2019

(87) PCT Pub. No.: WO2018/223458
PCT Pub. Date: Dec. 13, 2018

(65) Prior Publication Data
US 2019/0337445 A1 Nov. 7, 2019

(30) Foreign Application Priority Data

Jun. 6, 2017 (CN) .......................... 2017 1 0419105

(51) Int. Cl.
*B60Q 1/26* (2006.01)
*F21S 43/14* (2018.01)
(Continued)

(52) U.S. Cl.
CPC .............. *B60Q 1/2611* (2013.01); *B60Q 1/52* (2013.01); *B60R 11/04* (2013.01); *F21S 43/14* (2018.01);
(Continued)

(58) Field of Classification Search
CPC ......... B60Q 1/2611; B60Q 1/52; F21S 43/14; B60R 11/04; G06K 9/62; G08B 25/10; G08B 21/22
(Continued)

(56) References Cited

U.S. PATENT DOCUMENTS 9,912,919 B2 * 3/2018 Yoshimura ............. H04N 7/185
10,322,668 B2 * 6/2019 Gao ......................... B60Q 1/52
(Continued)

FOREIGN PATENT DOCUMENTS

CN 202463689 U 10/2012
CN 103745223 A 4/2014
(Continued)

OTHER PUBLICATIONS

International Search Report for Application No. PCT/CN2017/091151 dated Feb. 24, 2018.
(Continued)

*Primary Examiner* — Eric Blount
(74) *Attorney, Agent, or Firm* — Tarolli, Sundheim, Covell & Tummino LLP

(57) ABSTRACT

A multifunctional automobile alarm lamp includes an LED lighting device, a lamp housing, a rod mounting base and a lighting control device. The LED lighting device is installed in the lamp housing; the rod mounting base includes a connecting rod, a connecting board and a fixing bracket; the connecting board is for connecting the lamp housing; the connecting rod is for connecting the connecting board; the connecting rod is connected to the fixing bracket by a sliding sleeve method; the fixing bracket is installed to the top of the police car at where the alarm lamp is situated; the lighting control device is connected to the LED lighting device for
(Continued)

controlling the lighting method of the LED lighting device. The present invention can expand the application functions of the LED alarm lamp.

5 Claims, 1 Drawing Sheet

(51) Int. Cl.
*B60Q 1/52* (2006.01)
*B60R 11/04* (2006.01)
*G06K 9/62* (2006.01)
*G08B 21/22* (2006.01)
*G08B 25/10* (2006.01)

(52) U.S. Cl.
CPC .............. *G06K 9/62* (2013.01); *G08B 21/22* (2013.01); *G08B 25/10* (2013.01)

(58) Field of Classification Search
USPC ....................................... 340/425.5
See application file for complete search history.

(56) References Cited

U.S. PATENT DOCUMENTS

| 2012/0201041 A1* | 8/2012 | Gergets | ............... B60Q 1/2611 |
| | | | 362/493 |
| 2014/0369060 A1* | 12/2014 | Zhang | ...................... F21V 9/08 |
| | | | 362/542 |

FOREIGN PATENT DOCUMENTS

| CN | 204055548 U | 12/2014 |
| CN | 205247582 U | 5/2016 |
| JP | 2000294003 A | 10/2000 |
| JP | 2011100409 A | 5/2011 |

OTHER PUBLICATIONS

International Written Opinion for Application No. PCT/CN2017/091151 dated Feb. 24, 2017.

* cited by examiner

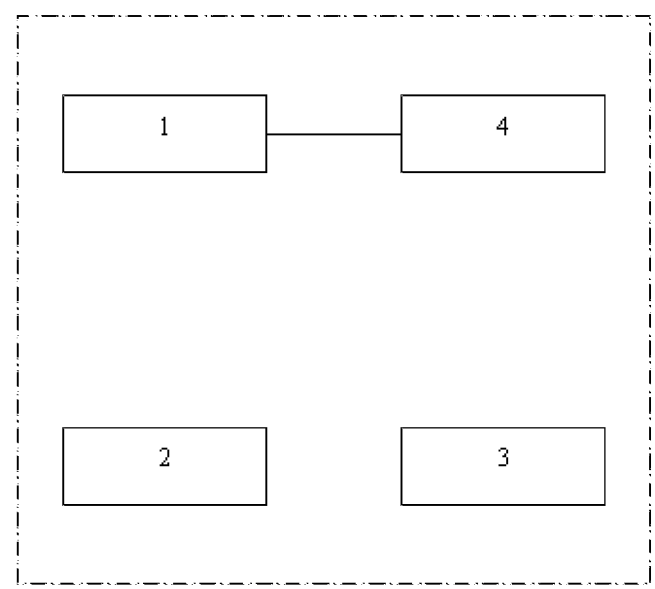

MULTIFUNCTIONAL VEHICLE ALARM LAMP

RELATED APPLICATIONS

The present invention is a U.S. National Stage under 35 USC 371 patent application, claiming priority to Serial No. PCT/CN2017/091151, filed on 30 Jun. 2017; which claims priority of CN 201710419105.4, filed on 6 Jun. 2017, the entirety of both of which are incorporated herein by reference.

FIELD OF THE INVENTION

The present invention relates to an LED alarm lamp, and more particularly to a multifunctional automobile alarm lamp.

BACKGROUND OF THE INVENTION

In general, alarm lamps with different lengths are provided for the purpose of fitting various car models and applications, and there are structures with a lampshade assembly and a color combination applied to the lampshade on a side if needed. In addition, the alarm lamp may be divided according to the form of light source into a rotating bulb lamp, an LED flash lamp, and a Xenon strobe tube lamp, wherein the LED flash form is an upgraded version of the rotating bulb lamp with longer service life, better power saving, and lower heat generation.

The alarm lamp has significant effects when it is used in the following situations. For example, it is necessary for a construction unit to light up an alarm lamp during a road construction, particularly in the dark conditions at night, since accidents may occur or people unfamiliar with the conditions may be tripped easily. These may also lead to a traffic jam. Obviously, it is necessary and mandatory to set up the alarm lamp for road construction. Secondly, the alarm lamp is also applied to driving on a road, and it is very common to have problems in long-time driving occasionally. In case of requiring to stop a car on the road, drivers need to place a danger alarm lamp to remind passing vehicles to notice the obstacle in front, slow down, and drive safely.

At present, the alarm lamp is used extensively and frequently in police work, but its function is limited to the warning effect, and present existing hardware resources have not been fully utilized yet, and it is necessary to expand its assisting tools to indicate that a police officer on the police car is carrying out a police task.

SUMMARY OF THE INVENTION

Therefore, it is a primary objective of the present invention to overcome the aforementioned drawbacks of the prior art by providing a multifunctional automobile alarm lamp that sets a target in an actual area of a predetermined human area range as a human target by a specific image identification method, and fetches an image from the human target as a human sub-image, and matches the human sub-image with a face image of each suspect. If there is a match, then the suspect's name corresponding to the matched face image will be outputted, and a hit signal will be issued to control the LED lighting device to switch to high-intensity lighting, so as to prompt nearby police officers of the existence of the suspect.

To achieve the aforementioned and other objectives, the present invention provides a multifunctional automobile alarm lamp comprising an LED lighting device, a lamp housing, a rod mounting base and a lighting control device, and the LED lighting device is installed in the lamp housing, and the rod mounting base comprises a connecting rod, a connecting board and a fixing bracket, and the connecting board is for coupling the lamp housing, and the connecting rod is for coupling the connecting board, and the connecting rod is coupled to the fixing bracket by a sliding sleeve method, and the fixing bracket is installed to the top of the police car at where the alarm lamp is situated, and the lighting control device is coupled to the LED lighting device for controlling the lighting method of the LED lighting device.

Wherein, the lighting control device is installed in the front-end dashboard of the police car at where the alarm lamp is situated, and the lighting control device controls the LED lighting device to switch among three lighting methods which are OFF, blinking and high intensity lighting methods respectively.

The multifunctional automobile alarm lamp further comprises a GPS positioning device installed in the front-end dashboard of the police car at where the alarm lamp is situated for providing the current GPS position of the police car to the alarm lamp.

The multifunctional automobile alarm lamp further comprises a wireless communication device installed to the front end of a car body of the police car at where the alarm lamp is situated for establishing a two-way wireless communication link with a remote police control center.

The multifunctional automobile alarm lamp further comprises: a fisheye camera installed to the top of the car body of the police car for performing an image capture of a surrounding scene of the police car at where the alarm lamp is situated to obtain a corresponding high-definition image;

a binary processing device, for receiving the high-definition image, and executing a greyscale processing of the high-definition image to obtain a greyscale image and a binary processing of the greyscale image to obtain a binary image;

an opening operation processing device, coupled to the binary processing device, for receiving the binary image, and executing an erosion followed by a dilation of the binary image to obtain opening operation image;

a closing operation processing device, coupled to the opening operation processing device, for receiving the opening operation image, and executing a dilation followed by an erosion of the opening operation image to obtain a closing operation image;

an information fetching device, coupled to the closing operation processing device, for executing a target testing of the closing operation image, calculating a pixel area of each target and the depth of field of each target, determining the occupancy percentage of the area of each target based on the pixel area of each target and the total pixel area of the closing operation image, and determining the actual area of each target based on the occupancy percentage of the area of each target and the depth of field;

a target fetching device, coupled to the information fetching device, for receiving the actual area of each target in the closing operation image, setting the target in the predetermined human area range of the actual area as a human target, fetching the human target from the closing operation image and using it as a human sub-image, matching the human sub-image with a face image of each suspect one by one, and if there is a match, then a suspect's name corresponding to the face image will be used as a target suspect's name, and a hit signal will be issued, and if there is no match at all, then a miss signal will be issued;

wherein, the lighting control device is coupled to the target fetching device for controlling the LED lighting device to switch to a high intensity lighting method when receiving the hit signal.

The multifunctional automobile alarm lamp further comprises a FLASH storage device coupled to the target fetching device for pre-storing a face image of each suspect.

The multifunctional automobile alarm lamp further comprises the wireless communication device which is a frequency division duplex communication interface coupled to the lighting control device for sending the target suspect's name to a remote police control center when receiving the target suspect's name.

The multifunctional automobile alarm lamp further comprises the lighting control device for controlling the LED lighting device to exit from the high intensity lighting method when receiving the miss signal.

In the multifunctional automobile alarm lamp, the binary processing device, the opening operation processing device, the closing operation processing device, the information fetching device and the target fetching device are installed in the front-end dashboard of the police car at where the alarm lamp is situated.

BRIEF DESCRIPTION OF THE DRAWING

FIG. 1 is a structural block diagram of a multifunctional automobile alarm lamp in accordance with an embodiment of the present invention.

DESCRIPTION OF THE PREFERRED EMBODIMENTS

The technical contents of the present invention will become apparent with the detailed description of preferred embodiments accompanied with the illustration of related drawings as follows. It is intended that the embodiments and figures disclosed herein are to be considered illustrative rather than restrictive.

In general, the alarm lamps adopt red and blue colors mainly for the following reasons: 1. Red is a primary color in the warm color system which has a warning effect, and blue is a primary color in the cold color system which is a sharp contrast to the red color and capable of attracting people's attention. 2. These colors have the features of strong light penetration at night. 3. The red color is eye-catching. For color blind people, the red and blue colors can be distinguished, because red is eye-catching. 4. As to feeling, psychologists have done a tolerability test. Two water pipes of which hot water and cold water are passing through respectively are used for the test, and these two pipes are tangled to form a knot. When touching the large connected pipe, we discovered that we can tolerate the feeling of the cold water pipe or the feeling of the hot water pipe alone, but the feeling of the tangled pipe has brought a lot of excitement to the senses. From a psychological point of view, this problem may be explained. A very large prompting effect can be achieved by a comparison of the two sensory elements.

Present existing hardware resources of a traditional alarm lamp are not fully utilized, and thus leading to a single function of the alarm lamp. For example, the traditional alarm lamp is unable to identify a nearby criminal or spot an identified criminal, so as to facilitate a policeman to arrest the criminal. To overcome the aforementioned deficiency of the prior art, the present invention provides a multifunctional automobile alarm lamp.

With reference to FIG. 1 for a structural block diagram of a multifunctional automobile alarm lamp in accordance with an embodiment of the present invention, the multifunctional automobile alarm lamp comprises an LED lighting device, a lamp housing, a rod mounting base and a lighting control device, and the LED lighting device is installed in the lamp housing, and the rod mounting base comprises a connecting rod, a connecting board and a fixing bracket, and the connecting board is for coupling the lamp housing, and the connecting rod is for coupling the connecting board, and the connecting rod is coupled to the fixing bracket by a sliding sleeve method, and the fixing bracket is installed to the top of the police car at where the alarm lamp is situated, and the lighting control device is coupled to the LED lighting device for controlling the lighting method of the LED lighting device;

wherein, the lighting control device is installed in the front-end dashboard of the police car at where the alarm lamp is situated, and the lighting control device is provided for controlling the LED lighting device to switch among the three lighting methods which are OFF, blinking and high intensity lighting methods respectively.

The specific structure of the multifunctional automobile alarm lamp of the present invention is described in details as follows.

The multifunctional automobile alarm lamp further comprises: a GPS positioning device, installed in the front-end dashboard of the police car at where the alarm lamp is situated, for providing the current GPS position of the police car at where the alarm lamp is situated.

The multifunctional automobile alarm lamp further comprises: a wireless communication device, installed to a front end of a car body of the police car at where the alarm lamp is situated, for establishing a two-way wireless communication link with a remote police control center.

The multifunctional automobile alarm lamp further comprises:

a fisheye camera installed to the top of the car body of the police car for performing an image capture of a surrounding scene of the police car at where the alarm lamp is situated to obtain a corresponding high-definition image;

a binary processing device, for receiving the high-definition image, and executing a greyscale processing of the high-definition image to obtain a greyscale image and a binary processing of the greyscale image to obtain a binary image;

an opening operation processing device, coupled to the binary processing device, for receiving the binary image, and executing an erosion followed by a dilation of the binary image to obtain opening operation image;

a closing operation processing device, coupled to the opening operation processing device, for receiving the opening operation image, and executing a dilation followed by an erosion of the opening operation image to obtain a closing operation image;

an information fetching device, coupled to the closing operation processing device, for executing a target testing of the closing operation image, calculating a pixel area of each target and the depth of field of each target, determining the occupancy percentage of the area of each target based on the pixel area of each target and the total pixel area of the closing operation image, and determining the actual area of each target based on the occupancy percentage of the area of each target and the depth of field;

a target fetching device, coupled to the information fetching device, for receiving the actual area of each target in the closing operation image, setting the target in the predetermined human area range of the actual area as a human target, fetching the human target from the closing operation image and using it as a human sub-image, matching the human sub-image with a face image of each suspect one by one, and if there is a match, then a suspect's name corresponding to the face image will be used as a target suspect's name, and a hit signal will be issued, and if there is no match at all, then a miss signal will be issued;

wherein, the lighting control device is coupled to the target fetching device for controlling the LED lighting device to switch to a high intensity lighting method when receiving the hit signal.

The multifunctional automobile alarm lamp further comprises a FLASH storage device coupled to the target fetching device for pre-storing a face image of each suspect.

The multifunctional automobile alarm lamp further comprises the wireless communication device which is a frequency division duplex communication interface coupled to the lighting control device for sending the target suspect's name to a remote police control center when receiving the target suspect's name.

The multifunctional automobile alarm lamp further comprises the lighting control device for controlling the LED lighting device to exit from the high intensity lighting method when receiving the miss signal.

In the multifunctional automobile alarm lamp, the binary processing device, the opening operation processing device, the closing operation processing device, the information fetching device and the target fetching device are installed in the front-end dashboard of the police car at where the alarm lamp is situated.

In addition, the Time Division Duplex (TDD) is a duplex method for communication systems, such as a mobile communication system for separating the receiving and transmitting channels. The mobile communication tends to be developed in the third generation, China submitted a draft of a third-generation communication standard (TD-SCDMA) in June, 1997, and the features of the TDD mode and smart antenna of the new technology are highly rates and the TD-SCDMA standard becomes one of the three major candidate standards. The FDD mode of the first-generation and second-generation mobile communication systems unified the world, and the TDD mode did not attract much attention at the beginning. With new businesses requirements and new technological developments and many advantages of the TDD mode, the TDD mode is catching more and more attention.

The operating principle of the time division duplex is described below: TDD is a duplex method of a communication system, and used in a mobile communication system for separating the receiving and transmitting channels (uplink of downlink). In a mobile communication system of the TDD mode, receiving and transmission are taken place in the same frequency channel (which is in a different timeslot of a carrier wave) to use time to separate the receiving and transmitting channels. In a mobile communication system of the FDD mode, the receiving and transmission are taken place in two separate symmetrical frequency channels to use frequency band to separate the receiving and transmitting channels.

The features and communication benefits of the mobile communication systems adopting different duplex modes are different. The uplink and downlink channels of the mobile communication systems of the TDD mode use the same frequency, and thus have the reciprocity of the uplink and downlink channels, and it brings many advantages to the mobile communication systems of the TDD mode.

In the TDD mode, the transmission of uplink and downlink information can be done in the same wave carrier frequency. In other words, the transmission of the uplink information and the transmission of the downlink information can be achieved in the same carrier wave through time division.

The multifunctional automobile alarm lamp of the present invention aims at the technical issue that the conventional automotive alarm lamp cannot be used for police missions to integrate a plurality of high precision image processing devices into the hardware resource of the present existing alarm lamps and detect the existence of any suspect nearby. By entering the LED lighting device of the alarm lamp into a high intensity mode, the police officers nearby can be prompted to achieve the effect of arresting a nearby criminal suspect quickly.

While the present invention has been described by means of specific embodiments, numerous modifications and variations could be made thereto by those skilled in the art without departing from the scope and spirit of the present invention set forth in the claims.

What is claimed is:

1. A multifunctional automobile alarm lamp, comprising an LED lighting device, a lamp housing, a rod mounting base and a lighting control device, characterized in that the LED lighting device is installed in the lamp housing, and the rod mounting base comprises a connecting rod, a connecting board and a fixing bracket, and the connecting board is for coupling the lamp housing, and the connecting rod is for coupling the connecting board, and the connecting rod is coupled to the fixing bracket by a sliding sleeve method, and the fixing bracket is installed to the top of a police car at where the alarm lamp is situated, and the lighting control device is coupled to the LED lighting device for controlling the lighting method of the LED lighting device; wherein the lighting control device is installed in a front-end dashboard of the police car at where the alarm lamp is situated, and the lighting control device controls the LED lighting device to switch among three lighting methods, respectively OFF, blinking and high intensity lighting methods;

a GPS positioning device, installed in the front-end dashboard of the police car at where the alarm lamp is situated, for providing the current GPS position of the police car at where the alarm lamp is situated;

a wireless communication device, installed to a front end of a car body of the police car at where the alarm lamp is situated, for establishing a two-way wireless communication link with a remote police control center;

a fisheye camera, installed to the top of the car body of the police car at where the police car is situated, for performing an image capture of a surrounding scene of the police car at where the alarm lamp is situated to obtain corresponding high-definition image;

a binary processing device, for receiving the high-definition image, and executing a greyscale processing of the high-definition image to obtain greyscale image, and a binary processing of the greyscale image to obtain a binary image;

an opening operation processing device, coupled to the binary processing device, for receiving the binary image, executing an erosion followed by a dilation of the binary image to obtain opening operation image;

a closing operation processing device, coupled to the opening operation processing device, for receiving the opening operation image, and executing a dilation followed by an erosion of the opening operation image to obtain closing operation image;

an information fetching device, coupled to the closing operation processing device, for performing a target testing of the closing operation image, calculating and obtaining a pixel area of each target and the depth of field of each target, determining the occupancy percentage of the area of each target based on the pixel area of each target and the total pixel area of the closing operation image, and determining an actual area of each target based on the occupancy percentage of the area of each target and the depth of field;

a target fetching device, coupled to the information fetching device, for receiving the actual area of each target in the closing operation image, setting a target in a predetermined human area range of the actual area as a human target, fetching the human target from the closing operation image and using it as a human sub-image, matching the human sub-image with a face image of each suspect one by one, and if there is a match, then a suspect's name corresponding to the matched face image will be outputted as a target suspect's name and a miss signal will be issued; and wherein the lighting control device is coupled to the target fetching device for controlling the LED lighting device to switch to the high intensity lighting method when receiving the hit signal.

2. The multifunctional automobile alarm lamp according to claim 1, further comprising a FLASH storage device coupled to the target fetching device for pre-storing a face image of each suspect.

3. The multifunctional automobile alarm lamp according to claim 2, further comprising a wireless communication device which is a frequency division duplex communication interface coupled to the lighting control device for sending the target suspect's name to the remote police control center when receiving the target suspect's name.

4. The multifunctional automobile alarm lamp according to claim 3, further comprising the lighting control device that controls the LED lighting device to exit from the high intensity lighting method when receiving the miss signal.

5. The multifunctional automobile alarm lamp according to claim 4, wherein the binary processing device, the opening operation processing device, the closing operation processing device, the information fetching device and the target fetching device are installed in the front-end dashboard of the police car at where the alarm lamp is situated.

* * * * *